United States Patent [19]

Lee et al.

[11] Patent Number: 4,848,878
[45] Date of Patent: Jul. 18, 1989

[54] NON-GLARING REARVIEW MIRROR WITH LIQUID CRYSTAL MIXTURE

[75] Inventors: Eung-Sang Lee, Anyang; Sung-Joon Park, Kimpo, both of Rep. of Korea

[73] Assignee: Sansung Electron Devices Co. Ltd., Rep. of Korea

[21] Appl. No.: 142,637

[22] Filed: Jan. 11, 1988

[30] Foreign Application Priority Data

May 28, 1987 [KR] Rep. of Korea ............... 875333[U]
May 28, 1987 [KR] Rep. of Korea ............... 878379[U]

[51] Int. Cl.⁴ ............................................. G02F 1/13
[52] U.S. Cl. .................................. 350/349; 350/339 R
[58] Field of Search ........................... 350/349, 339 R

[56] References Cited

U.S. PATENT DOCUMENTS

| | | | |
|---|---|---|---|
| 3,597,044 | 8/1971 | Castellano | 350/349 |
| 4,490,015 | 12/1984 | Kawarada et al. | 350/349 |
| 4,588,617 | 5/1986 | Oka | 350/344 |
| 4,664,479 | 5/1987 | Hiroshi | 350/349 |
| 4,715,686 | 12/1987 | Iwashita et al. | 350/339 R |
| 4,729,638 | 3/1988 | Shirai | 350/339 R |

Primary Examiner—Stanley D. Miller
Assistant Examiner—Anita E. Pellman
Attorney, Agent, or Firm—Handal & Morofsky

[57] ABSTRACT

There is disclosed a rearview mirror absorbing the light when the orientation of the liquid crystal is caused to change.

A suitable amount of cholesteric material is added to the nematic liquid crystal of negative dielectric anisotropy mixed with a blue dye by 2%. The ratio of the thickness of the liquid crystal layer to the focal conic pitch d/p is limited within the range of 0.4 to 0.6. A silicone nitride layer is deposited on the upper transparent electrode so as to form an insulating film. A transparent adhesive layer is formed on the upper surface of the upper glass plate with a glass plate being pressed down to said adhesive layer.

4 Claims, 2 Drawing Sheets

NON-GLARING REARVIEW MIRROR WITH LIQUID CRYSTAL MIXTURE

BACKGROUND OF THE INVENTION

1. Field of the Invention

This invention relates to rearview mirrors for vehicles, and more particularly to a rearview mirror to absorb the incident light by using a liquid crystal of negative dielectric anistropy mixed with a blue dye by 2%.

2. Description of the Prior Art

When vehicles are driven at night, the drivers are dazzled by the light beams reflected into the sight from the headlights of following vehicles by the rearview mirrors. In order to prevent such dazzling of reflected light, rearview mirrors must be improved.

In the beginning, as the means for attenuating the reflections of light had been mainly used polarizers, color filters, and prisms together with a method of scattering light by means of an uneven reflecting surface.

However, since such a rearview mirror essentially attenuates the incident light to a certain level or otherwise, reflects the incident light toward a certain direction, the image of an object projected on the mirror is always not clear, false images are generated, etc., thereby making its practical use impossible.

Recently, a rearview mirror using a liquid crystal device having light absorption property is attracting attention. In this construction, a liquid crystal device is incorporated into the rearview mirror so that the orientations of the liquid crystal molecules are changed to absorb light when the amount of the light incident on the mirror exceeds a certain limit.

The liquid crystal used in the mirror said above is such a kind that a dichromatic dye mixes with a nematic liquid crystal of positive or negative dielectric anisotropy.

The nematic liquid crystal of positive dielectric anisotropy and the nematic liquid crystal of negative dielectric anisotropy are oriented parallel with the electrodes and absorb light respectively with the voltage not applied and with the voltage applied. Hence, the nematic liquid crystal of positive dielectric anisotropy should be always supplied with the voltage to keep its orientation perpendicular to the electrode, thereby resulting in high consumption of power and its life becoming short. On the other hand, the nematic liquid crystal of negative dielectric anisotropy seems to be the most suitable in view of power consumption and life, but it has the problem that the initial operating voltage is relatively high and the projected image becomes unclear owing to low on-off contrast ratio.

Furthermore, the life of a liquid crystal is impaired by ultraviolet rays, which causes the dichromatic dye of the liquid crystal to undergo chemical reaction and to be disqualified.

Further, because the vertical orientation films are not electrically insulated, electric currents flow between the electrodes due to the conductive impurities intervening into the liquid crystal during the manufacture, thereby resulting in shortcomings.

Besides, since glasses are much used in the mechanism employing the liquid crystal device, considerable fragments are scattered when the mirror is fragmentized, thereby causing safety problems.

SUMMARY OF THE INVENTION

It is the principal object of the present invention to provide a rearview mirror having high on-off contrast ratio and requiring little consumption of power.

It is an additional object of the present invention to provide a mirror that electrical insulation is made sure between the two transparent electrodes, a layer for blocking ultraviolet rays is formed to prolong the life, and fragments are not scattered when the mirror is fragmentized.

A rearview mirror of the present invention makes use of a liquid crystal of negative dielectric anistropy mixed with a blue die by 2%. A cholesteric material is suitably added to the liquid crystal so as to control the focal conic pitch. The ratio of the focal conic pitch should be maintained preferably from 0.4 to 0.6. This is to obtain the good on-off contrast ratio. Further, the transparent electrode inside the mirror is coated with an insulating film which can be a silicone nitride layer with the thickness of 300 to 1000 Å.

The invention will be better understood by the following description with reference to the attached drawings.

DETAILED DESCRIPTION OF THE PREFERRED EMBODIMENTS

Figure 1:
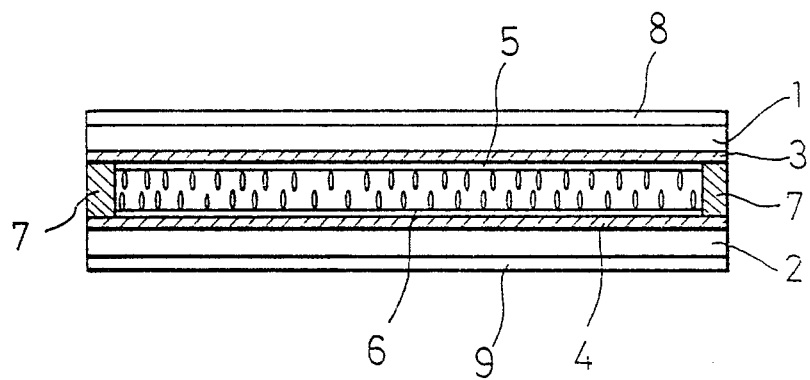
FIG. 1 is a cross-sectional view illustrating the structure of a rearview mirror according to an embodiment of this invention.

A rearview mirror of this invention is obtained through the following process.

Firstly, the ITO's(indium-thin-oxide) 3,4 is respectively deposited on the upper and lower glass plates 1,2. After the upper and lower vertical orientation layers 5,6 is formed on the ITOs 3,4 by using Spin-Coating method, the spacers are interposed between the glass plates 1,2 so that the spacers are arranged to maintain a certain gap therebetween and the periphery of the of spacers is shielded with sealing materials 7. Thereafter, the surface of the upper glass plate 1 is coated with a magnesium fluoride film 8, and the lower glass plate 2 is coated with a thin film of aluminium 9 by the thickness of 1500–3000 Å to form the reflecting surface.

Subsequently, a liquid crystal is injected through an inlet. As the liquid crystal, in this invention, is used a nematic liquid crystal of negative dielectric anisotrophy mixed with the blue dye by 2%. Specifically such liquid crystals are 4,4'-methoxyphthyl-azoxybenzene, 4-methoxyphenyl-4'-pentylebenzoate and 4-pentyleoxyphenyl-4'-n-pentylecyclo hexyl carboxylate, each of which may be individually or in a suitable mixture with others. For the blue dyes are exemplified various kinds, but the selection thereof should be made with considering the compatibility with the liquid crystal, all the barometers and the absorption wavelength.

The blue dye ZLI 3292 produced by E. Merck of West Germany which absorbs the visible lights is used in this invention.

When said liquid crystal is injected into the space between the upper and lower glass plates 1,2 through the inlet, the cholesteric material is added.

The cholesteric material controls the focal conic pitch of the liquid crystal and the more the cholesteric material is added, the shorter the pitch becomes. The ratio of the thickness d of the liquid crystal layer to the focal conic pitch p of the liquid crystal in the rearview mirror influence significantly the on-off contrast ratio. In order to obtain the most excellent on-off contrast ratio, the amount of the additive cholesteric material is regulated so that the relation d/p becomes within 0.4 to 0.6 in this invention.

In the rearview mirror of this invention described herein, because the orientation of the liquid crystal is perpendicular to the ITOs 3,4 when the voltage is not applied, the liquid crystal does not absorb the light. In this condition, therefore, the mirror reflects the incident light by the thin film of aluminium 9 deposited on the lower glass plate 2.

Figure 2:
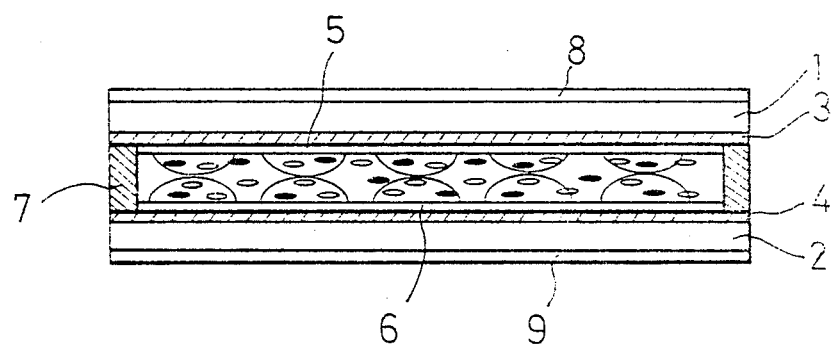
FIG. 2 is a cross-sectional view showing the change of the orientation according to the applied voltage.

However, if the amount of the incident light is more than a certain level, the voltage is applied to the ITOs 3,4 deposited on the upper and lower glass plates 1,2 and the liquid crystal is turned by 90° and becomes parallel with the ITOs 3,4, as shown in FIG. 2.

As a result, the molecular axis of the liquid crystal becomes perpendicular to the direction of incident light and so, the liquid crystal absorbs the light and the surface of the mirror appears blue owing to the blue dye mixed in the liquid crystal. In this process, the external light can be readily detected by a conventional photo sensor.

On other hand, because the ultraviolet component of the incident light is blocked by the magnesium fluoride layer 8, the dye does not change.

Figure 3:
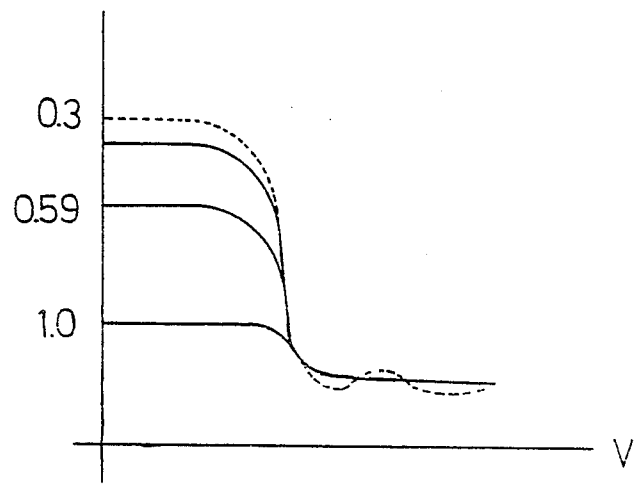
FIG. 3 is a graph showing the relation between the voltage and the light absorption according to the ratio of the thickness of the liquid crystal layer to focal conic pitch.

The relation between the light absorption and the voltage according to the ratio d/p in the rearview mirror of this invention is indicated in the graph of FIG. 3.

As shown in the graph, if the value d/p is smaller than 0.4, a rearview mirror connot be put to practical use because of the generation of the inflextion point of light absorption, but if the value d/p is within 0.4 to 0.6, the light absorption characteristics appear to be good.

Figure 4:
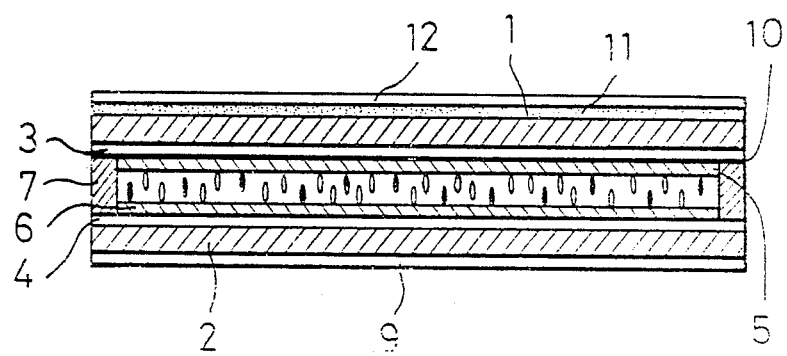
FIG. 4 is a cross-sectional view illustrating the structure of a rearview mirror according to another embodiment of this invention.

FIG. 4 depicts another embodiment of the rearview mirror according to this invention.

Insulating film 10 intervenes between the upper transparent electrode 3 and the vertical orientation layer 5 in this embodiment. The insulating film 10 is silicon nitride layer deposited with the thickness of 300 Å to 1000 Å. Instead of the magnesium fluoride layer 8, the transparent adhesive layer 11 is applied to the upper surface of the upper glass plate 1 with the thickness of about 1 mm and on the layer 11 is placed a glass plate 12, which is pressed at the temperature of 40° to 60° C. Polyvinylbutyral containing the appropriate amount of benzophenon is used as the transparent adhesive layer 11. Because the upper and lower transparent electrodes 3,4 is certainly insulated by the insulating film 10, they can not produce an electrical conduction even with the conductive impurities introduced. Besides, since the glass plate 12 adheres to the transparent adhesive layer 11, the fragments are not scattered out when the mirror is fragmentized accidentally, thereby harm to the human body being not caused.

Furthermore, because the benzophenon contained in the transparent adhesive layer 11 is capable of blocking ultraviolet rays, it protects the dichromatic dyes from deteriorating owing to ultraviolet rays.

What is claimed is:

1. A non-glaring mirror utilizing a liquid crystal mixture of variable orientation comprising a nematic liquid crystal of negative dielectric anisotropy mixed with a blue dye, said blue dye comprising 2 percent of said mixture and a cholesteric material added in an amount such that the ratio of the thickness of the liquid crystal layer to the focal conic pitch is within the range of 0.4 to 0.6 and further comprising a silicon nitride insulating film deposed on an upper transparent electrode in the thickness range of 300 to 490 angstroms.

2. A non-glaring mirror utilizing a liquid crystal mixture of variable orientation comprising a nematic liquid crystal of negative dielectric anisotropy mixed with a blue dye, said blue dye comprising 2 percent of said mixture and a cholesteric material added in an amount such that the ratio of the thickness of the liquid crystal layer to the focal conic pitch is within the range of 0.4 to 0.6 and further comprising a silicon nitride insulating film deposed on an upper transparent electrode in the thickness range of 300 to 490 angstroms, and wherein a transparent-to-visiblelight adhesive, said adhesive acting as an ultraviolet screen and comprising a layer approximately 1 mm thick of polyvinybutyral mixed with benzophenone said adhesive being positioned between the upper surface of an upper glass plate and a glass plate.

3. A non-glaring mirror utilizing a liquid crystal mixture of variable orientation comprising a nematic liquid crystal of negative dielectric anisotropy mixed with a blue dye, said blue dye comprising 2 percent of said mixture and a cholesteric material added in an amount such that the ratio of the thickness of the liquid crystal layer to the focal conic pitch is within the range of 0.4 to 0.6 and further comprising transparent-to-visiblelight adhesive, said adhesive acting as an ultraviolet screen and comprising a layer approximately 1 mm thick of polyvinylbutyral mixed with benzophenone said adhesive being positioned between the upper surface of an upper glass plate and a glass plate.

4. A non-glaring mirror as in claim 3, wherein said mirror further comprises a silicon nitride insulating film on an upper transparent electrode.

* * * * *